(12) United States Patent
Engelhardt et al.

(10) Patent No.: US 8,373,293 B2
(45) Date of Patent: Feb. 12, 2013

(54) PROTECTION SYSTEM OF A DOUBLY-FED INDUCTION MACHINE

(75) Inventors: Stephan Engelhardt, Sonsbeck (DE); Lars Kock, Krefeld (DE)

(73) Assignee: Woodward Kempen GmbH (DE)

( * ) Notice: Subject to any disclaimer, the term of this patent is extended or adjusted under 35 U.S.C. 154(b) by 7 days.

(21) Appl. No.: 13/090,420

(22) Filed: Apr. 20, 2011

(65) Prior Publication Data
US 2011/0210553 A1    Sep. 1, 2011

Related U.S. Application Data

(63) Continuation of application No. PCT/EP2008/064140, filed on Oct. 20, 2008.

(51) Int. Cl.
*F03D 9/00* (2006.01)
*H02P 9/04* (2006.01)

(52) U.S. Cl. .......................................... 290/44
(58) Field of Classification Search ............ 290/44, 290/55
See application file for complete search history.

(56) References Cited

U.S. PATENT DOCUMENTS

| | | | |
|---|---|---|---|
| 7,102,247 B2 * | 9/2006 | Feddersen .................... | 290/44 |
| 7,518,256 B2 * | 4/2009 | Juanarena Saragueta et al. ............................. | 290/44 |
| 7,939,954 B2 * | 5/2011 | Ruiz Flores et al. ........... | 290/44 |
| 2002/0014773 A1 | 2/2002 | Stricker | |
| 2007/0052244 A1 | 3/2007 | Hudson | |
| 2009/0267572 A1 | 10/2009 | Engelhardt et al. | |

FOREIGN PATENT DOCUMENTS

| | | |
|---|---|---|
| DE | 10 2006 027 465 A1 | 12/2007 |
| EP | 1 965 075 A1 | 9/2008 |
| JP | 07-067393 A | 3/1995 |
| WO | WO 03/065567 A1 | 8/2003 |

OTHER PUBLICATIONS

Machine translation of JP 07067393 9 sheets. May 29, 2012.*

* cited by examiner

*Primary Examiner* — Javaid Nasri
(74) *Attorney, Agent, or Firm* — Reinhart Boerner Van Deuren P.C.

(57) ABSTRACT

A protection system for a doubly-fed induction machine; with a stator and a rotor. The stator of the doubly-fed induction machine is connected to a grid, and the rotor of the doubly-fed induction machine is connected to the grid via a converter. The converter includes a machine side converter, and a DC-link and a line side converter. The protection system also includes at least one crowbar, the crowbar being connected to the rotor, at least one DC-chopper provided in the DC-link, a converter controller, and a separate protection device for DC-chopper and the at least one crowbar.

16 Claims, 2 Drawing Sheets

PROTECTION SYSTEM OF A DOUBLY-FED INDUCTION MACHINE

CROSS-REFERENCE TO RELATED PATENT APPLICATIONS

This patent application is a continuation of pending PCT/EP2008/064140, filed Oct. 20, 2008, the entire teachings and disclosure of which are incorporated herein by reference thereto.

FIELD OF THE INVENTION

The invention relates to a protection system of a doubly-fed induction machine.

BACKGROUND OF THE INVENTION

Doubly-fed induction machines are used in connection with wind power stations located alone or in wind parks. In principle the doubly-fed induction machine is also used in water power stations. Due to the demand to use wind parks with a weak connection to the grid, for example in the case of an off-shore wind park, unbalanced grid operation of the wind power station in the case of a grid fault has to be taken into consideration in construction of control units of the doubly-fed induction machines. One aim is to avoid disconnection of the wind power stations from the grid for example in the case of drop of the grid voltage. In order to avoid damages in the control units of a wind power station or a damage of the doubly-fed induction machine, a so-called "crowbar" is used, which is connected to the rotor side of the doubly-fed induction machine in order to protect the machine side converter. Crowbar circuits can be of different designs and are well known. This enables the wind power station to ride through grid faults without being disconnected due to over-voltages. Additionally, in order to avoid over-voltages in the DC-link, a DC-chopper can be equipped to reduce the DC-link voltage. In common control units, the converter controller protects the doubly-fed induction machine by controlling the operation of the crowbar as well as the DC-chopper in the DC-link. However, using the converter controller has the disadvantage that the sampling rate to control the operation of DC-chopper and the crowbar cannot be increased without low effort, because the converter controller also controls the machine side and the line side converter.

Furthermore it is known from the European patent application EP 1 965 075 A1 to control the crowbar via a separate device. But, a separate device controlling merely the operation of a crowbar is not suitable to achieve the desired stability during grid faults.

Therefore, it is an object of the present invention to provide a protection system and a protection method of a doubly-fed induction machine which can be easily used with high sampling rates and which provides a good protection for the doubly fed induction machine. Furthermore, it is an object of the present invention to propose an advantageous use of the inventive protection system.

SUMMARY OF THE INVENTION

The above mentioned object is solved according to a first teaching of the present invention in that the DC-chopper and the crowbar are controlled with the separate protection device.

The embodiments of the protection system as describe herein, can include a doubly-fed induction machine with a stator and a rotor, the stator of said doubly-fed induction machine is connected to a grid and the rotor of said doubly-fed induction machine is connected to the grid via a converter, said converter comprises a machine side converter, a DC-link and a line side converter, the system comprises additionally at least one crowbar, said crowbar is connected to the rotor, at least one DC-chopper provided in the DC-link, a converter controller and a separate protection device. Moreover, the invention relates to a method to protect a doubly-fed induction machine as well as to a wind park.

The separate protection device can be constructed small and fast in its response time due to high driver frequencies, e.g. around 100 kHz. Contrary to the prior art, the inventive protection device controls the crowbar and the DC-Chopper with very short response times and achieves a high protection level of the doubly-fed induction machine. The expenses to achieve short response time are quite low, because only the protection function has to be provided by the separate protection device. For example a single Field-Programmable-Grid-Array can provide such function with a very short response time with low cost. This increases also the mean time between failures (MTBF) because the protection device can be build much less complex compared to a complete converter controller. Additionally the separate protection device can be easily made EMC-safe which allows the placement of the protection device in the immediate vicinity of electromagnetic radiation emitting devices.

According to a first embodiment of the present invention, the protection device comprises means to measure the voltage of the DC-link and means to start and stop operation of the DC-chopper depending at least on the measured voltage values and means to start operation of the crowbar. Measuring the DC-link voltage allows detecting critical situations of the converter and defining threshold values to start and stop DC-chopper or to start the crowbar. Since the crowbar is a passive circuit only, preferably only a start signal has to be provided to the crowbar. Firing pulses of the "passive" crowbar stop after zero-crossing of the crowbar currents.

In order to protect the DC-chopper against excessive heat, the protection device comprises a counter to count firing pulses of the DC-chopper and/or means to measure the operating time of the DC-chopper. The heat generated in the DC-chopper depends strongly on the energy flowing through the DC-chopper. However, this energy depends on the number of firing pulses and the operating time of the DC-chopper. The protection device according to this embodiment of the inventive protection system allows controlling the heat in the DC-chopper and prevents the DC-chopper from destruction by stopping operation of the DC-chopper after a certain time.

A very fast signaling technology which is additionally electromagnetic-safe is provided by a next embodiment of the inventive protection system in that the protection device comprises output units capable of providing control signals for the DC-chopper and/or the crowbar using fiber optics. However, in the case of a passive crowbar an ignition device has to be provided.

According to a next advantageous embodiment of the inventive protection system, the converter controller comprises means to control a switch unit to disconnect the doubly-fed induction machine from the grid. This allows to protect the crowbar from destruction, if the crowbar has to provide too high rotor currents which leads to an overheating of the crowbar. The converter controller can optionally include means to measure the crowbar current directly or determine the crowbar current by the difference of the current measured at the machine side converter and the rotor current.

However, in order to avoid expenses for additional A/D converters to measure the rotor current or the crowbar current according to a next embodiment of the inventive protection system, the converter controller comprises means to calculate the current of the crowbar using an estimated rotor current and the current measured at the machine side converter. Since the converter controller obligatory measures several machine state variables like stator voltage, stator current, machine side converter current, machine side converter voltage and grid voltage or grid current, it is possible to estimate the rotor current and therefore to calculate the crowbar current. This allows the converter to switch off the doubly-fed induction machine from the grid if for example the integral $I^2t$, with I as the crowbar current and t as switch-on time, exhibits a certain value related to an overheating of the crowbar.

Since the function of the crowbar is to protect the machine side converter from destruction, the crowbar has to absorb high currents in a very short time. According to a next preferred embodiment of the inventive protection system, the crowbar comprises thyristors with optional resistors which are able to absorb high currents in short time.

In order to provide a protection system for the crowbar circuits according to a preferred embodiment, the switch-off unit controlled by the converter controller comprises switches arranged in the line side converter path and the stator circuit and/or arranged in the common connection of line side converter path and stator circuit with the grid. Both alternatives allow to switch-off the doubly-fed induction machine from the grid for example due to an overheating of the crowbar.

According to a next teaching of the present invention, the above object is solved with a method to protect the doubly-fed induction machine with a stator and a rotor, the stator is connected to a grid, the rotor is connected to the grid via a converter, which converter consists at least of a machine side converter, a DC-link and a line side converter, additionally at least one crowbar, at least one DC-chopper, a DC-link, a converter controller and a separate protection device, wherein the separate protection device controls operation of the crowbar and the DC-chopper. As already pointed out, the protection device is very flexible with respect to its placement, allows to realize a short response time without causing high expenses and has an increased reliability.

According to a first embodiment of the inventive method, the protection device measures the DC-link voltage and starts the operation of the DC-chopper depending on threshold values for the DC-link voltage. The threshold values of the DC-link voltage allow to observe the DC-link and to protect the DC-link from overvoltage values, since the operating DC-chopper lowers the DC-link voltage directly.

However, according to a next embodiment it is preferred that the protection device counts the firing pulses of the DC-chopper or measures the operating time of the DC-chopper in order to prevent the DC-chopper from overheating. With this measure, the operating time or the number of firing pulses can be limited to specific values.

In order to consider the temperature of the DC-chopper originating from previous operation cycles preferably according to a next embodiment of the inventive method, the minimum switch-off time of the DC-chopper depends on the number of firing pulses or the amount of operating time in a previous operating cycle of the DC-chopper. This allows taking temperature of the DC-chopper during previous operating cycles into account in order to provide overheating of the DC-chopper.

In order to protect the crowbar from overheating, the converter controller controls the switch-unit to switch off the doubly-fed induction machine from the grid.

In order to minimize efforts to protect the crowbar by the converter controller according to a preferred embodiment of the inventive method, the converter controller estimates a rotor current by using a machine model of a doubly-fed induction machine and measured values for example of the stator voltage, the stator current and the angle between stator and rotor voltage, whereas the crowbar current is determined from the difference of the estimated rotor current and the measured machine side converter current. With this measure, the converter controller is enabled to detect the crowbar current and to protect the crowbar from overheating without the necessity of expensive A/D-converters.

According to a next embodiment of the inventive method, a doubly-fed induction machine is switched-off from the grid by the converter controller if a critical load of the crowbar is determined by calculating the integral $I^2t$ with I as crowbar current and t as switch-on time. The value of the integral $I^2t$ is proportional to the increase of the temperature of the crowbar circuit during operation. Hence, this value allows protecting the crowbar circuits from overheating.

According to a third teaching of the present invention, the above mentioned object is solved by a wind park comprising at least one wind power station with an inventive protection system. In particular wind parks or wind power stations take advantage of the inventive protection system, because often wind parks and wind power stations face unbalanced grid voltage states which become critical for the converter of a wind power station. Overall, the operating time of the wind power station can be increased with the inventive protection system. Nevertheless, the use of the inventive protection system or the inventive protection method of a doubly-fed induction machine is advantageous for doubly-fed induction machines used for power generation in principle, e.g. used in hydropower stations.

BRIEF DESCRIPTION OF THE DRAWINGS

The accompanying drawings incorporated in and forming a part of the specification illustrate several aspects of the present invention and, together with the description, serve to explain the principles of the invention. There are a lot of possibilities to further develop the inventive protection system of a doubly-fed induction machine as well as the inventive protection method. The drawings show in.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION

Figure 1:
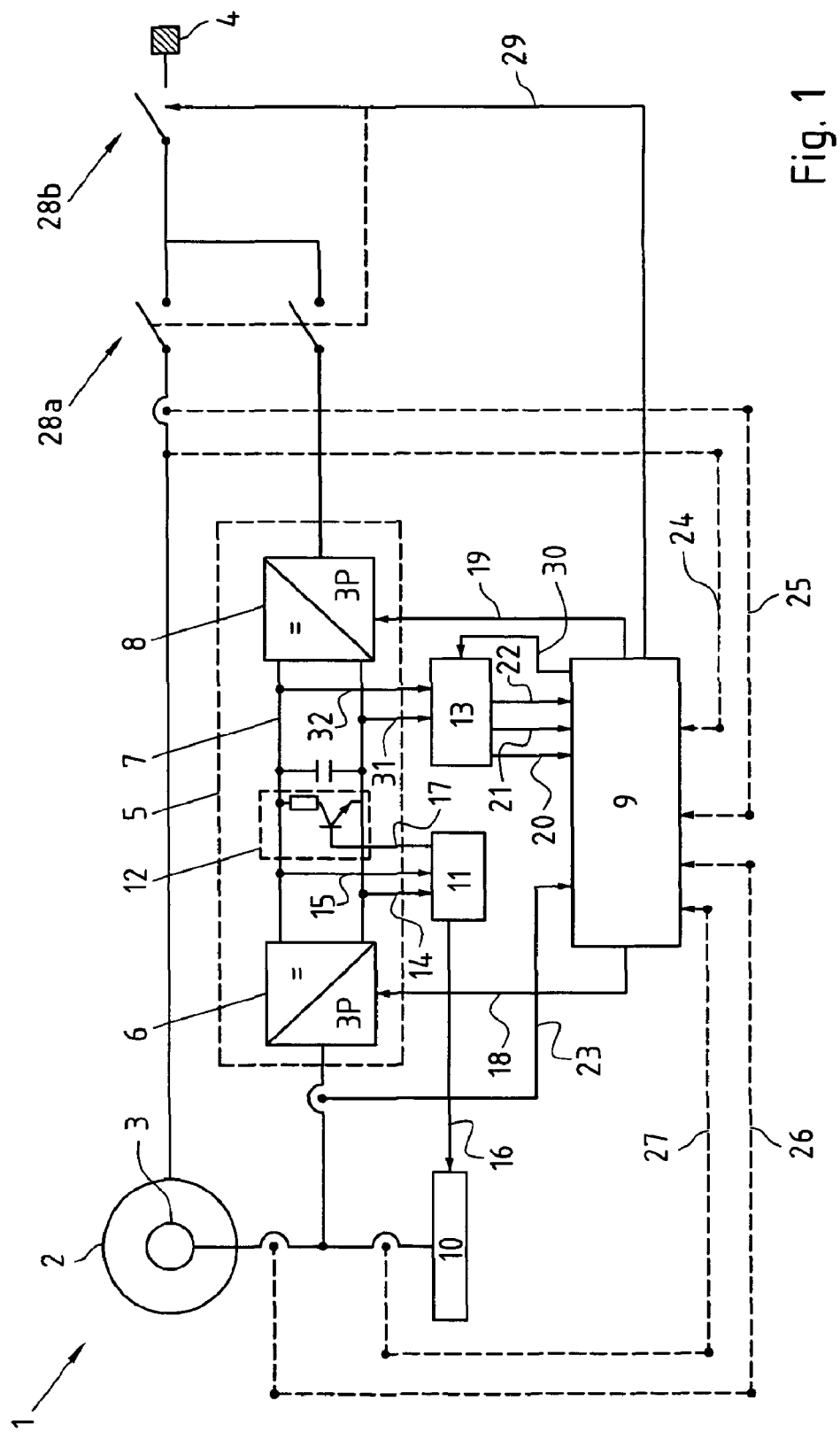
FIG. 1 is an inventive embodiment of the protection system of a doubly-fed induction machine in a schematic block diagram and in FIG. 2 is an axis of ordinate defining several threshold values of the DC-link voltage according to a second embodiment of the invention.

FIG. 1 shows a doubly-fed induction machine 1 with a stator 2 and a rotor 3. In the present embodiment the stator 2 is directly connected to the grid 4. However, a transformer is not shown to simplify matters. The rotor 3 of the doubly-fed induction machine 1 is connected via a converter 5 to the grid 4, whereas the converter 5 consists of a machine side converter 6, a DC-link 7 and a line side converter 8. Furthermore, a converter controller 9 is provided to control machine side converter 6 and the line side converter 8 in order to the function of the doubly-fed induction machine to provide electrical power to the grid.

The inventive protection system shown in FIG. 1 comprises additionally a crowbar 10 and a separate protection device 11. Said protection device 11 is connected to the crowbar 10 as well as to a DC-chopper 12 provided in the DC-link 7. Moreover, a measurement device 13 is provided, which measures the DC-link voltage by means 31, 32 in order to provide values of the measured DC-link voltage to the converter controller 9.

The separate protection device 11 in the present embodiment receives by means 14 and 15 the voltage of the DC-link 7. However, the DC-link voltage can be provided to the protection device even as a digital electronic value.

Separate protection device 11 has the single function to start and stop operation of the DC-chopper 12 and to fire the crowbar. If for example the DC-link voltage increases above a specific threshold value, the DC-chopper is switched on. If the DC-link voltage increases further on, the protection device 11 starts the crowbar 10 via an output signal 16. The output signals 16 and 17 of the protection device are provided by output units which are preferably capable to provide signals via fiber optics in order to provide an EMC-safe connection to the controlled DC-chopper or crowbar.

Figure 2:
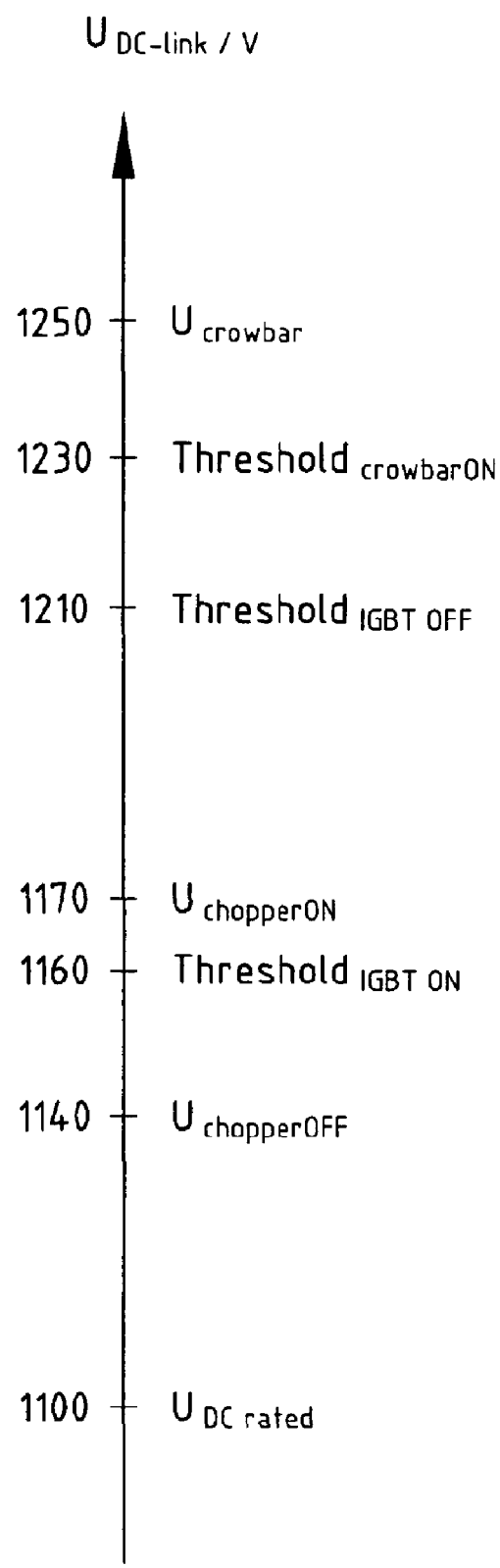

In the case of high DC-link voltages, e.g. caused by grid faults, the crowbar protects the IGBTs of the converter by short-circuiting the rotor, thus suppressing further power flow from the rotor into the DC-link. In this case, converter controller 9 switches the machine side converter 6 off, in order to avoid high currents flowing through its IGBTs. Switching the IGBT-circuits of the machine side converter 6 off can be initiated by a threshold value which is preferably lower than the threshold value to start the crowbar as shown in FIG. 2. The converter controller 9 controls the machine side converter 6 and the line side converter 8 by its output signals 18 respectively 19. A third output signal 30 of the converter controller 9 provides a clock signal to the measurement device 13 in order to synchronize operation of the converter controller 9 and the measurement device 13. Measurement device 13 provides the measured DC-link voltage 20, a signal 21 referring to the threshold value of the DC-link voltage for the IGBT-circuits of the converter to be switched off or on as well as a signal 22 to signalize that the crowbar will be fired if the DC-link voltage increases further. It is also possible to measure the DC-link voltage and monitor the thresholds directly by the converter controller 9.

In order to protect even the crowbar as well as the complete doubly-fed induction machine from overheating or destruction, the converter controller comprises means to estimate the rotor current in order to estimate the crowbar current. In the present embodiment the converter controller 9 uses the measured machine side converter current 23 for determining the crowbar current.

In order to avoid expensive AD-converters with a high accuracy to measure the rotor current, a model for the doubly-fed induction machine is used to estimate the rotor current. The crowbar current is then determined by the difference of the value of the estimated rotor current and the measured machine converter current 23. The rotor current is estimated using the following model for a doubly-fed induction machine.

The state equation for the stator path of the doubly-fed induction machine is:

$$\underline{u}_s = r_s \underline{i}_s + \underline{\dot{\psi}}_s \tag{1}$$

with
$\underline{u}_s$: stator voltage vector in the stator frame coordinate system,
$r_s$: resistance of the stator,
$\underline{i}_s$: stator current vector in the stator frame coordinate system,
$\underline{\psi}_s$: stator flux vector in the stator frame coordinate system.

The transformation into a synchronous coordinate system rotating with stator frequency yields:

$$\underline{u}_{s,dq} = r_s \underline{i}_{s,dq} + j \cdot \omega_s \cdot \underline{\psi}_{s,dq} + \underline{\dot{\psi}}_{s,dq} \tag{2}$$

with
$\underline{u}_{s,dq}$: stator voltage vector in the synchronous coordinate system,
$\underline{i}_{s,dq}$: stator current vector in the synchronous coordinate system,
$\underline{\psi}_{s,dq}$: stator flux vector in the synchronous coordinate system and
$\omega_s$: stator angular frequency.

The flux component $\underline{\dot{\psi}}_{s,dq}$ decreases relatively fast after grid faults and is zero in steady state operation, therefore it can often be neglected in the praxis.

With the aid of the stator flux equation of the doubly-fed induction machine:

$$\underline{\psi}_{s,dq} = l_s \underline{i}_{s,dq} + l_m \underline{i}_{r,dq} \tag{3}$$

equation (2) becomes:

$$\underline{u}_{s,dq} = r_s \underline{i}_{s,dq} + j \cdot \omega_s \cdot (l_s \underline{i}_{s,dq} + l_m \underline{i}_{r,dq}) \tag{4}$$

with
$l_s$ = stator path inductance,
$l_m$ = main inductance.

With equation (4) the rotor current can be estimated to $$\underline{i}_{r,dq} = \frac{\underline{u}_{s,dq} - (r_s + j \cdot \omega_s \cdot l_s) \cdot \underline{i}_{s,dq}}{j \cdot \omega_s \cdot l_m} \tag{5}$$

and transformed back into the stator frame coordinate system.

The machine side converter current $\underline{i}_{MSC}$ is measured in the rotor coordinate system and can be transformed into the stator coordinate system with the rotor position angle.

The crowbar current $\underline{i}_{Crowbar}$ can then be estimated as:

$$\underline{i}_{Crowbar} = \underline{i}_r - \underline{i}_{MSC} \tag{6}$$

Thus, the converter controller 9 is able to determine the crowbar current without detecting the crowbar current directly. Only the values of the stator voltage and stator current detected by means 24 and 25 are necessary. Dotted lines of means 24 and 25 show that they are optional for the inventive protection system.

Instead of using the estimation of the rotor current via a machine model it is even possible to use the rotor current detected by means 26 directly or to measure the crowbar current detected by means 27.

Depending on the values of the crowbar current, the converter controller 9 preferably determines the integral $I^2 t$ with I as the crowbar current and t as switch-on time in order to determine the temperature increase of the crowbar circuits 10. In the case of a critical load of the crowbar, the converter controller uses the switch-off units 28a and/or 28b to switch off the doubly-fed induction machine 1 from the grid 4. This allows a very high protection level of the electrical components of the doubly-fed induction machine.

FIG. 2 shows the different voltage values as an embodiment of the present invention in order to protect the doubly-fed induction machine. On the ordinate, the different DC-link threshold voltages with their respective functions are shown. The voltage examples given refer to a rated voltage $U_{DCrated}$ of 1100 V.

The protection device 11 handles the values $U_{crowbar}$, $U_{chopperON}$ and $U_{chopperOFF}$; the converter controller 9 monitors the values "Threshold IGBT ON", "Threshold IGBT OFF" and "Threshold crowbar ON" via the measurement device 13.

The protection device 11 switches the DC-chopper 12 on respectively off, depending on the two thresholds $U_{chopperON}$ and $U_{chopperOFF}$. The value of $U_{chopperON}$ has to be greater than $U_{chopperOFF}$ for example 1170 V and 1140 V. The DC-chopper 12 will lower the DC-link voltage by dissipating the electric energy into heat. However, operation of the DC-chopper can be stopped already by counting the number of firing pulses or measuring operation time, too. If the DC-link voltage increases further up to a third threshold $U_{crowbar}$ which has to be greater than the aforementioned values, for example 1250V, the protection device sends a signal to fire the crowbar 10.

The two devices DC-chopper 12 and crowbar 10 are thus controlled only by the protection device 11.

To ensure further protection of the converter 5, the converter controller 9 monitors the DC-link voltage and thresholds by means of the measurement device 13 which sends respective signals. If the DC-link voltage rises over the value to switch the chopper on and reaches "Threshold IGBT OFF" (for example 1210 V), the IGBTs of the machine side converter 6 are switched off, because a further increase of the DC-link voltage will lead to crowbar firing and the IGBTs must be switched off when the crowbar is activated due to avoid high currents. To guarantee that the activation of the crowbar can be detected by the converter controller properly, "Threshold crowbar ON" has to be chosen a bit less than $U_{crowbar}$, for example 1230V, due to component tolerances of the protection and the measurement devices. The machine side converter will be switched on again after the DC-link voltage has decreased to the value "Threshold IGBT ON" (for example 1160 V). This ensures that the IGBTs can be operated without being overloaded.

When the crowbar 10 is switched on, the operating time of the crowbar is then observed by the converter controller as described above. In order to protect the doubly-fed induction machine from destruction or overheating the doubly-fed induction machine 1 is disconnected from the grid via the switch units 28a and/or switch unit 28b. Therefore, a good protection system of the doubly-fed induction machine 1 is provided by the inventive protection system which even protects the crowbar and the DC-chopper from overheating.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Protection system of a doubly-fed induction machine, the system comprises a doubly-fed induction machine (1) with a stator (2) and a rotor (3), the stator (2) of said doubly-fed induction machine (1) is connected to a grid (4) and the rotor (3) of said doubly-fed induction machine (1) is connected to the grid (4) via a converter (5), said converter (5) comprises a machine side converter (6), a direct-current(DC)-link (7) and a line side converter (8), the system comprises additionally at least one crowbar (10), said crowbar (10) is connected to the rotor (3), at least one direct-current(DC)-chopper (12) provided in the DC-link (7), a converter controller (9) and a separate protection device (11) wherein, the DC-chopper (12) and the crowbar (10) are controlled by the separate protection device (11).

2. Protection system of claim 1, wherein, the protection device (11) comprises means (14, 15) to measure a voltage of the DC-link (7), and means (17) to start and stop operation of the DC-chopper (12) depending at least on the measured voltage and means (16) to start operation of the crowbar (10).

3. Protection system of claim 1, wherein, the protection device (11) comprises a counter to count firing pulses of the DC-chopper (12) and/or means to measure an operating time of the DC-chopper (12).

4. Protection system of claim 1, wherein, the protection device (11) comprises output units capable of providing control signals for the DC-chopper (12) and/or the crowbar (10) using fiber optics (16, 17).

5. Protection system of claim 1, wherein, the converter controller (9) comprises means (29) to control a switch unit (28a, 28b) to disconnect the doubly-fed induction machine (1) from the grid (4).

6. Protection system of claim 1,
wherein,
the converter controller (9) comprises means to calculate a current of the crowbar (10) using an estimated rotor current and current measured at the machine side converter.

7. Protection system of claim 1,
wherein,
the crowbar (10) comprises thyristors with optional resistors.

8. Protection system of claim 1,
wherein,
a switch-off unit (28a,28b) comprises switches arranged in the line side converter path and the stator circuit or arranged in a common connection of line side converter path and stator circuit with the grid (4).

9. Wind park comprising at least one wind power station with a protection system according to claim 1.

10. Method to protect a doubly-fed induction machine wherein a stator of the doubly-fed induction machine is connected to a grid, a rotor of the doubly-fed induction machine is connected to the grid via a converter, which converter consists at least of a machine side converter, a DC-link and a line side converter, additionally at least one crowbar, at least one DC-chopper in the DC-link, a converter controller and a separate protection device
wherein,
the separate protection device controls operation of the crowbar and the DC-chopper.

11. The method of claim 10,
wherein,
the protection device counts firing pulses of the DC-chopper or measures an operating time of the DC-chopper.

12. The method of claim 10,
wherein,
a minimum switch-off time of the DC-chopper depends on a number of firing pulses or the amount of operating time in a previous operating cycle of the DC-chopper.

13. The method of claim 10,
wherein,
the converter controller controls a switch-unit to switch off the doubly-fed induction machine from the grid.

14. The method of claim 10,
wherein,
the converter controller estimates a rotor current by using a machine model of the doubly-fed induction machine and measured values of a stator voltage, a stator current and an angle between stator and rotor voltage, whereas a crowbar current is determined from a difference of the estimated rotor current and a measured machine side converter current.

15. The method of claim 10,
wherein,
the doubly-fed induction machine is switched-off from the grid by the converter controller if a critical load of the crowbar is determined by calculating an integral of $I^2 t$ over time with I as crowbar current and t as switch-on time.

16. The method of claim 10,
wherein,
the protection device measures a DC-link voltage and starts an operation of the DC-chopper depending on threshold values for the DC-link voltage.

* * * * *